United States Patent [19]

Yamada

[11] Patent Number: 5,212,597
[45] Date of Patent: May 18, 1993

[54] PROJECTION LENS SYSTEM FOR PROJECTORS

[75] Inventor: Hiroshi Yamada, Omiya, Japan

[73] Assignee: Fuji Photo Optical Co., Ltd., Omiya, Japan

[21] Appl. No.: 782,311

[22] Filed: Oct. 24, 1991

[30] Foreign Application Priority Data

Oct. 25, 1990 [JP] Japan .................................. 2-285733
Nov. 30, 1990 [JP] Japan .................................. 2-330172

[51] Int. Cl.$^5$ ............................................. G02B 3/02
[52] U.S. Cl. ..................................... 359/649; 359/708
[58] Field of Search ............... 359/649, 708, 754, 755, 359/776

[56] References Cited

U.S. PATENT DOCUMENTS

| | | | |
|---|---|---|---|
| 4,767,199 | 8/1988 | Yamamoto et al. | 359/755 |
| 5,048,940 | 9/1991 | Ueda et al. | 359/649 |
| 5,066,113 | 11/1991 | Nakajima et al. | 359/708 |

Primary Examiner—Bruce Y. Arnold
Assistant Examiner—James Phan
Attorney, Agent, or Firm—Oblon, Spivak, McClelland, Maier & Neustadt

[57] ABSTRACT

A projection lens system for projectors, which has, consecutively from the side of the viewing screen, a first positive lens component $L_1$, a second plastic lens component $L_2$, third to sixth lens components $L_3$ to $L_6$ constituted by a combination of a couple of convex glass lenses of strong power and a couple of concave glass lenses of strong power, a seventh lens component $L_7$, and an eighth negative lens component $L_8$ in the form having a concave surface disposed on the side of the viewing screen, at least one of the lens surfaces of each of the first lens component $L_1$, second lens component $L_2$, seventh lens component $L_7$ and eighth lens component $L_8$ being an aspheric surface, and the overall power of the couple of glass lenses of the lens components $L_3$ to $L_6$ commanding a main power of the whole projection lens system.

6 Claims, 11 Drawing Sheets

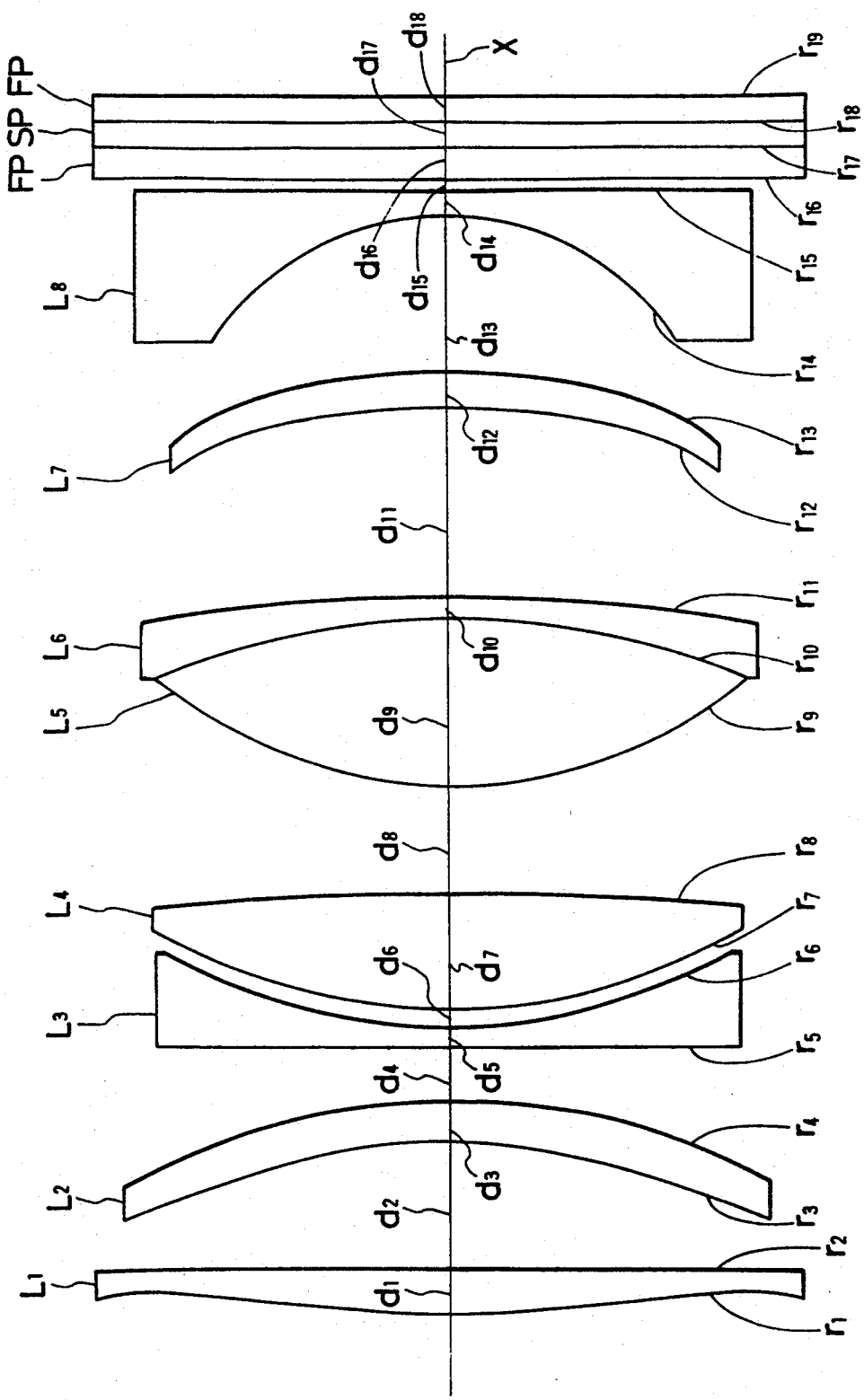

PROJECTION LENS SYSTEM FOR PROJECTORS

BACKGROUND OF THE INVENTION

1. Field of the Art

This invention relates to a projection lens system suitable for use on projectors for projection of CRT (cathode ray tube) picture images on a large viewing screen.

2. Description of the Prior Art

Projectors are generally arranged to project picture images of projection tubes of three colors of red (R), Green (G) and blue (B) through a projection lens system which is located forward of the projection tubes, thereby to project tricolor picture images on a large viewing screen located forward of the lens system. Heretofore, it has been the general practice for the projection lens systems of this sort to employ glass or plastic lenses, without paying much attention to the necessity for positive correction means for chromatic aberration because of the narrow luminous spectral width of the fluorescent material of the projection tube which is akin to the spectral width of monochromatic light.

However, in order to meet the recent demands for higher picture quality, the projection lens systems especially for high-definition TV or for large screen projectors are required to be able to make corrections for chromatic aberration to a sufficient degree in addition to high resolution power. For the purpose of meeting these requirements, it is conceivable to construct a projection lens system which has all of its lens elements constituted by plastic lenses. In this connection, the correction of monochromatic aberration is possible by the use of plastic lenses which can be easily formed in large diameter and aspheric shape by injection molding. Under the current circumstances, however, the plastic lenses have a limited freedom in selection of material and, in addition to insufficient correction of chromatic aberration, involve an objectionable degree of temperature dependent shifts of the image point due to large temperature and linear expansion coefficients of the refractive index of plastic material.

On the other hand, a projection lens system which is constituted by glass lenses alone can easily make corrections for the chromatic aberration and temperature-dependent shift of the image point, but normally there have to be provided at least six to seven glass lenses, resulting in increased production cost and weight.

In an attempt to overcome these problems, there have been developed the so-called hybrid type projection lens systems which employ a combination of plastic and glass lenses. The systems of this type are markedly improved in chromatic aberration and temperature dependent shift of the image point as compared with the systems which are composed of glass or plastic lenses alone, but still need further improvements in these and other respects to meet the recent demands for higher picture quality.

SUMMARY OF THE INVENTION

Under these circumstances, it is an object of the present invention to provide a projection lens system of the hybrid type employing plastic lenses in combination with glass lenses, the projection lens system being improved with regard to various aberrations to project picture images of higher quality.

In accordance with the present invention, there is provided, for achieving the above-stated objective, a projection lens system which has, consecutively from the side of the viewing screen, a first lens component $L_1$ in the form of a positive plastic lens, a second lens component $L_2$ in the form of a plastic lens of weak power, third to sixth lens components $L_3$ to $L_6$ which are a combination of a couple of convex glass lenses of strong power and a couple of concave glass lenses of strong power, a seventh lens component $L_7$ in the form of a plastic lens of weak power, and an eighth lens component $L_8$ in the form of a negative plastic lens having a concave surface disposed on the side of the viewing screen, at least one of the lens surfaces of each of the first lens component $L_1$, second lens component $L_2$, seventh lens component $L_7$ and eighth lens component $L_8$ being an aspheric surface.

BRIEF DESCRIPTION OF THE DRAWINGS

The above and other objects, features and advantages of the invention will become apparent from the following description of preferred embodiments and the appended claims, taken in conjunction with the accompanying drawings which are given for the purpose of illustration only and therefore should not be construed as limitative of the invention and in which:

FIG. 10 is a diagrammatic illustration of lens construction in a sixth embodiment of the invention.

DESCRIPTION OF PREFERRED EMBODIMENTS

Figure 1:
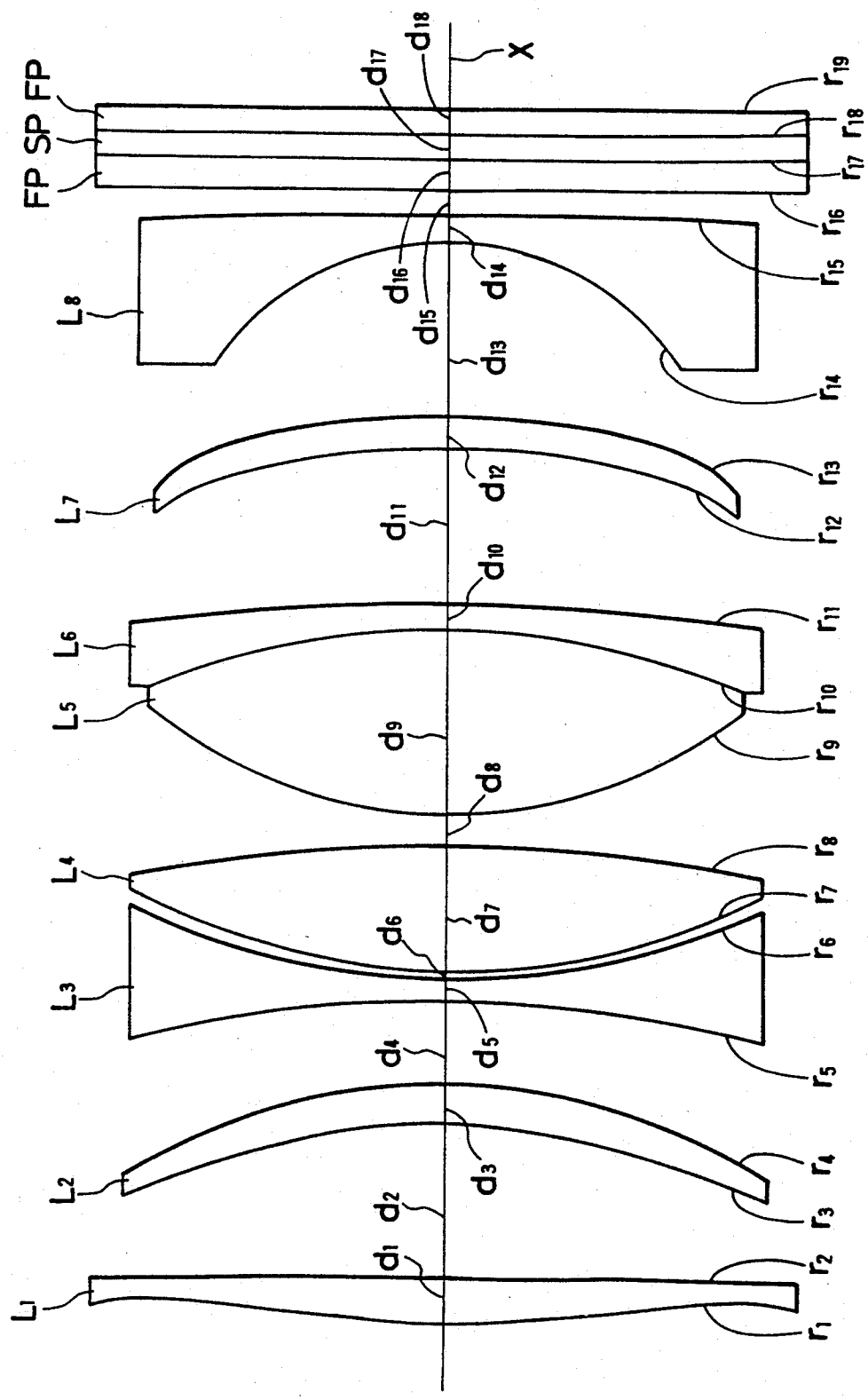
FIG. 1 is a diagrammatic illustration of lens construction in a first embodiment of the invention.
Figure 2A:
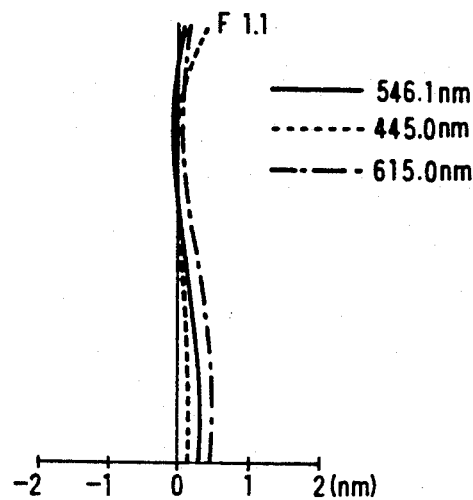
FIGS. 2a-2d show diagrams of aberrations calculated on the basis of numerical data of the first embodiment.
Figure 2B:
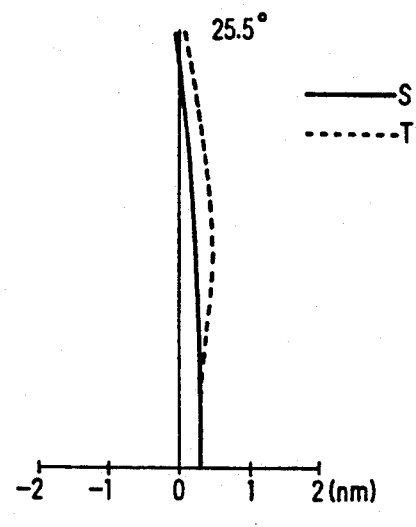
Figure 2C:
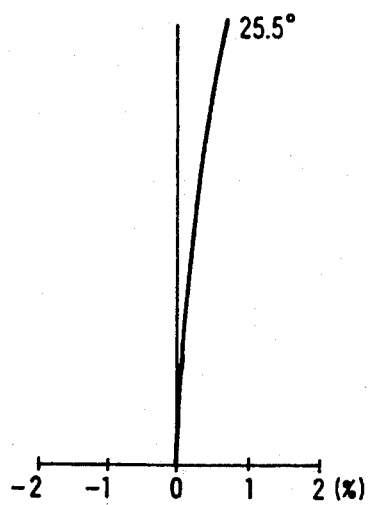
Figure 2D:
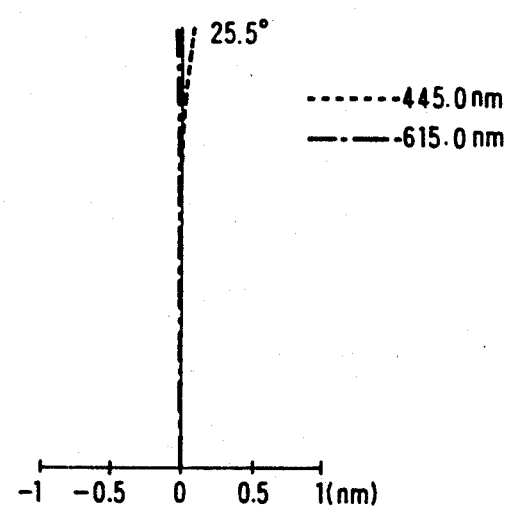

Hereafter, the invention is described more particularly by way of its preferred embodiments with reference to the drawings.

Shown in FIGS. 1, 3, 5, 7 and 10 are various lens constructions which fall in the sphere of the present invention. In these figures, indicated at $L_1$ to $L_8$ are lens components which are numbered consecutively from the side of the viewing screen. The first lens component $L_1$ is in the form of a positive plastic lens. The second lens component $L_2$ is in the form of a positive or negative plastic lens of weak power. The third to sixth lens components $L_3$ to $L_6$ are a combination of a couple of convex glass lenses of strong power and a couple of concave glass lenses of strong power, and have a main optical power of the whole projection lens system. The seventh lens component $L_7$ is in the form of a positive or negative plastic lens of weak power. The eighth lens component $L_8$ is in the form of a negative plastic lens having a concave surface on the side of the viewing screen.

The present invention employs aspheric plastic lens components for part of the constituent lens components of the whole system, thereby to improve monochromatic aberration and reduce the number of lens components for the purpose of weight reduction, while weakening the plastic lens power to suppress temperature dependent variations in picture quality. Besides, the glass lens components of the system suitably correct the chromatic aberration which is difficult to correct by plastic lenses, and take the major part of the power of the system, compensating for the shortcomings of plastic lenses and suppressing the temperature dependent variations in picture quality as they are less susceptible to influences of temperature variations.

The third to sixth lens components $L_3$ to $L_6$ are provided in the form of a combination of a couple of convex glass lenses of strong power and a couple of concave glass lenses of strong power. This is because it is difficult to correct the longitudinal chromatic aberration and lateral chromatic aberration completely by a combination of a single concave glass lens and a single convex glass lens, which permits the correction of chromatic aberrations only at one stage. Dividing the concave glass lens power into two parts of power permits to correct the chromatic aberrations at two separate stages, making it possible to make necessary corrections for longitudinal chromatic aberration and lateral chromatic aberration favorably and completely in a positive manner well in the capacity of each glass lens. It follows that the glass lenses still leave a margin for correction of other aberrations, suppressing spherical aberration and coma to a minimum. Accordingly, it becomes possible to obtain satisfactory contrast and high resolution for realization of high picture quality.

The first lens component $L_1$ is a single-element, positive plastic lens which has an aspheric surface on at least one of its lens surfaces to make corrections for various aberrations, especially for sagittal coma and the like.

The second lens component $L_2$ is a single-element, positive or negative plastic lens of weak power which is located with a relatively broad spacing from the first lens component $L_1$ and has an aspheric surface on at least one of its lens surfaces to make corrections mainly for spherical aberration.

The third to sixth lens components $L_3$ to $L_6$ constitute a combination of four glass lens components which are located with a relatively wide spacing from the second lens component $L_2$ and including a couple of convex glass lenses of strong power and a couple of concave glass lens similarly of strong power, and which may be a combination of a cemented lens and single-element lenses or a combination of single-element lenses alone. The third to sixth lens components $L_3$ to $L_6$ serve mainly for corrections of longitudinal chromatic aberration and lateral chromatic aberration and, for this purpose, the couple of concave glass lenses are preferred to satisfy the condition of $$0.3 < \phi CS / \phi CL < 1.0$$

where $\phi$ CL is the lens power of the stronger one of the two concave glass lenses and $\phi$CS is the lens power of the weaker concave glass lens.

The glass lenses of the third to sixth lens components $L_3$ to $L_6$ are preferred to be located in the order of ∨ ∧ ∨ ∧, ∨ ∧ ∧ ∨, ∧ ∨ ∧ ∨ or ∧ ∨ ∨ ∧ from the side of the viewing screen ( ∨ =a concave lens, ∧ =a convex lens).

The seventh lens component $L_7$ is a positive or negative single-element lens of weak power located with a relatively broad spacing from the sixth lens component $L_6$, and has an aspheric surface on at least one of its lens surfaces for effective correction of tangential coma.

The eighth lens component $L_8$ is a negative single-element lens located with a relatively broad spacing from the seventh lens component L, and has a concave surface of a small radius of curvature faced toward the viewing screen, and has at least one of its lens surfaces formed in an aspheric shape with functions of making corrections mainly for field curvature.

The use of plastic lenses for the first lens component $L_1$, second lens component $L_2$, seventh lens component $L_7$ and eighth lens component $L_8$ contributes to a material reduction in weight of the lens system as a whole.

In the following description, various notations are used for the convenience of explanation, including:

f: Focal length of the projection lens system;
F: F number;
m: Lens surface number counted from the side of the viewing screen;
$r_1$ to $r_n$: Radius of curvature of a lens or faceplate;
$d_1$ to $d_n$: On-axis thickness of a lens or faceplate or width of an air spacing;
$n_1$ to $n_n$: Refractive index of a lens with respect to line e;
$\gamma_1$ to $\gamma_n$: Abbe number of a lens;
FP: Faceplate of the projection tube;
SP: Spacing (filled with a liquid).

Each aspheric surface is indicated by an asterisk * and, on the basis of z-axis in the direction of the optical axis and y-axis in the direction perpendicular to the optical axis, its shaped is expressed as $$Z = \frac{cy^2}{1 + \sqrt{1 - (1 + K) c^2 y^2}} + a_1 y^4 + a_2 y^6 + a_3 y^8 + a_4 y^{10}$$

where c is the apex curvature, K is the eccentricity, and $a_1$ to $a_4$ are aspheric coefficients. The expressions of "f", "r" and "d" which appear in the following description are in the unit of mm.

EMBODIMENT 1

The lens construction of Embodiment 1 is shown in FIG. 1, including: a front group composed of a lens component $L_1$ taking the form of a biconvex lens in a center portion at and around the optical axis and having surface #1 concaved toward the screen and in a direction away from the optical axis to have a negative power in outer portions remote from the optical axis, a positive meniscus lens component $L_2$ having a concave surface on the screen side, a negative biconcave lens $L_3$, a positive biconvex lens $L_4$, and a cemented lens $L_5+L_6$ combining a positive biconvex lens $L_5$ with a negative meniscus lens $L_6$ having a concave surface on the screen side; and a rear group composed of a positive meniscus lens $L_7$ having a concave surface on the screen side, and a negative meniscus lens $L_8$ having a concave surface on the screen side.

A relatively wide air spacing is formed between the first and second lens components $L_1$ and $L_2$, between the second and third lens components $L_2$ and $L_3$, between the sixth and seventh lens components $L_6$ and $L_7$, and between the seventh and eighth lens components $L_7$ and $L_8$.

The particulars of the lens construction are as follows.

| \multicolumn{5}{c}{$f = 139.1$  $F = 1.10$} |
| Projective magnification: ×22.9 | | | | |
| m | r | d | n | ν |
|---|---|---|---|---|
| *1 | 255.510 | 9.00 | 1.49217 | 57.2 |
| *2 | −10000.000 | 33.49 | | |
| *3 | −108.450 | 8.00 | 1.49217 | 57.2 |
| *4 | −107.350 | 17.15 | | |
| 5 | −263.040 | 4.50 | 1.60647 | 34.8 |
| 6 | 158.170 | 1.36 | | |
| 7 | 142.760 | 26.95 | 1.62549 | 60.3 |
| 8 | −354.380 | 6.66 | | |
| 9 | 102.790 | 38.80 | 1.61758 | 61.9 |
| 10 | −165.820 | 4.75 | 1.77901 | 31.2 |
| 11 | −510.420 | 32.51 | | |
| *12 | −424.150 | 7.00 | 1.49217 | 57.2 |
| *13 | −255.180 | 37.24 | | |
| *14 | −60.054 | 4.90 | 1.49217 | 57.2 |
| *15 | −5112.370 | 5.40 | | |
| 16(FP) | ∞ | 6.50 | 1.54212 | |
| 17(SP) | ∞ | 4.81 | 1.43000 | |
| 18(FP) | ∞ | 5.75 | 1.57125 | |
| 19 | ∞ | | | |

$\phi CS/\phi CL = 0.517$
Aspheric Coefficients

| | Surface #1 | Surface #2 |
|---|---|---|
| K | 0.0 | 0.0 |
| $a_1$ | $-1.606242 \times 10^{-7}$ | $1.2134030 \times 10^{-8}$ |
| $a_2$ | $-7.806872 \times 10^{-12}$ | $3.1944840 \times 10^{-12}$ |
| $a_3$ | $-9.3519385 \times 10^{-16}$ | $-5.5065225 \times 10^{-16}$ |
| $a_4$ | $-1.9190193 \times 10^{-19}$ | $-1.1060835 \times 10^{-19}$ |
| | Surface #3 | Surface #4 |
| K | 0.0 | 0.0 |
| $a_1$ | $5.9017775 \times 10^{-7}$ | $4.2028291 \times 10^{-7}$ |
| $a_2$ | $-7.8752571 \times 10^{-11}$ | $-7.3297978 \times 10^{-11}$ |
| $a_3$ | $6.8398328 \times 10^{-15}$ | $6.3950345 \times 10^{-15}$ |
| $a_4$ | $-1.6511343 \times 10^{-19}$ | $-2.4603407 \times 10^{-19}$ |
| | Surface #12 | Surface #13 |
| K | 0.0 | 0.0 |
| $a_1$ | $-7.6099417 \times 10^{-7}$ | $-4.3355388 \times 10^{-7}$ |
| $a_2$ | $3.1140158 \times 10^{-11}$ | $-1.2283814 \times 10^{-11}$ |
| $a_3$ | $-7.5808536 \times 10^{-16}$ | $3.5347121 \times 10^{-14}$ |
| $a_4$ | $3.2173740 \times 10^{-21}$ | $-1.1494480 \times 10^{-17}$ |
| | Surface #14 | Surface #15 |
| K | 0.0 | 0.0 |
| $a_1$ | $1.3433345 \times 10^{-7}$ | $8.1380438 \times 10^{-9}$ |
| $a_2$ | $-1.7046733 \times 10^{-10}$ | $-3.4878685 \times 10^{-11}$ |
| $a_3$ | $9.3630054 \times 10^{-14}$ | $4.6155057 \times 10^{-15}$ |
| $a_4$ | $-1.9715514 \times 10^{-17}$ | $3.7494914 \times 10^{-19}$ |

FIG. 2 shows diagrams of aberrations calculated on the basis of the specific numerical figures of the above lens construction. These aberration diagrams are of aberrations in defocused state at the central best position of the image surface, all taking into consideration the faceplates, coolant liquid and cover glass. The same applies to all of the aberration diagrams which will be mentioned hereinafter.

EMBODIMENT 2

Figure 3:
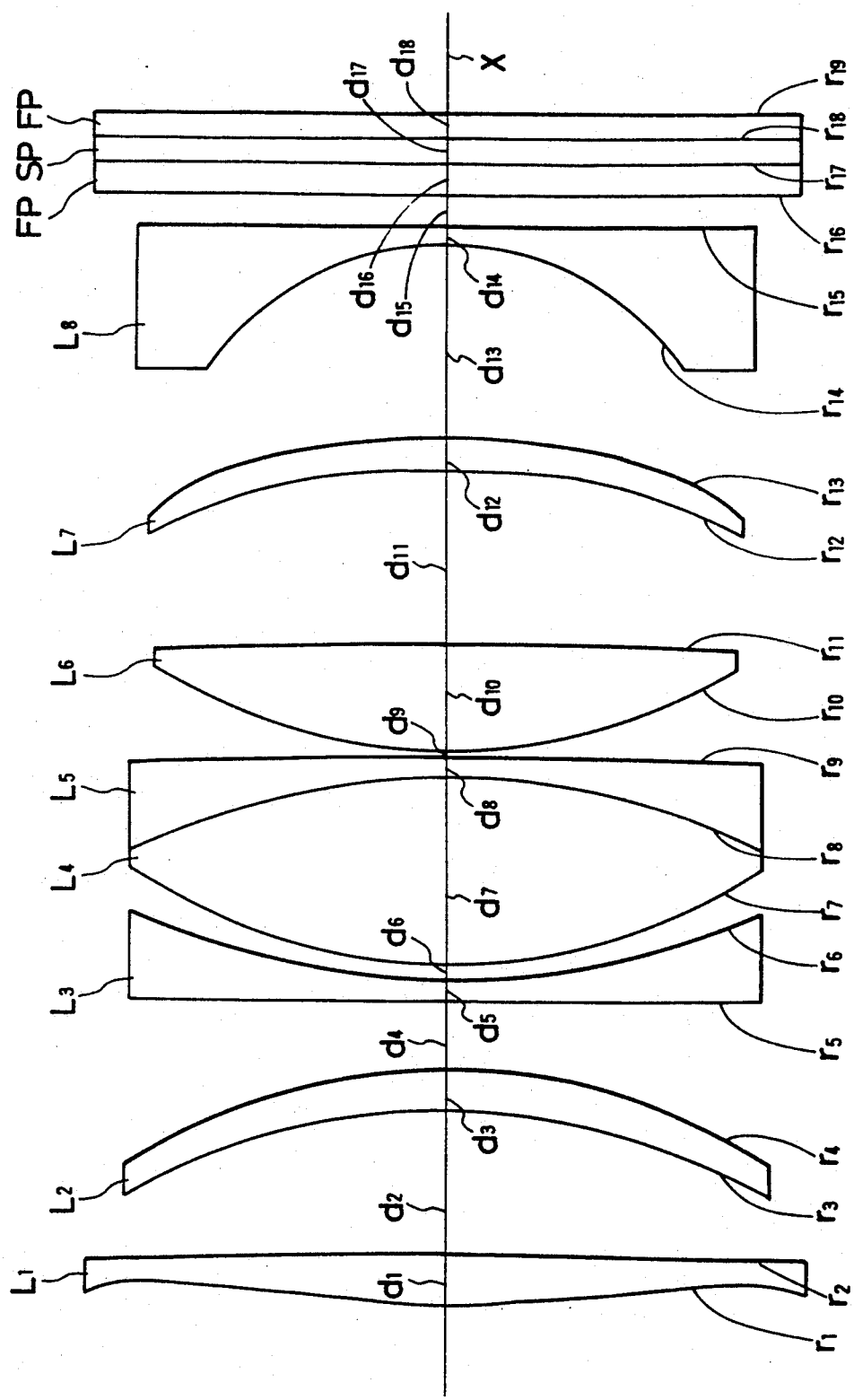
FIG. 3 is a diagrammatic illustration of lens construction in a second embodiment of the invention.
Figure 4A:
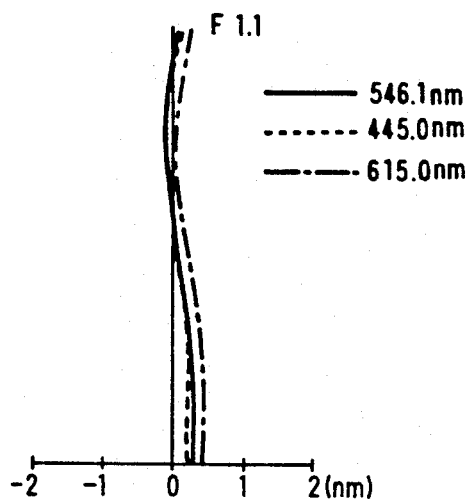
FIGS. 4a-4d show diagrams of aberrations calculated on the basis of numerical data of the second embodiment.
Figure 4B:
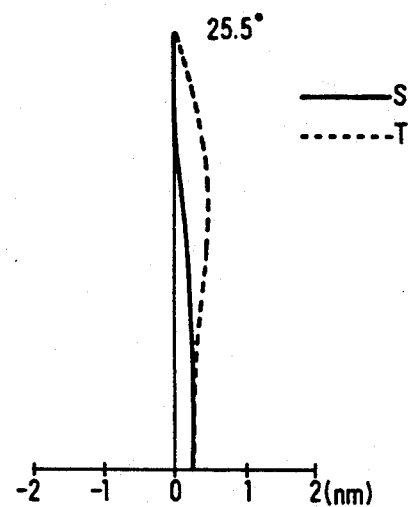
Figure 4C:
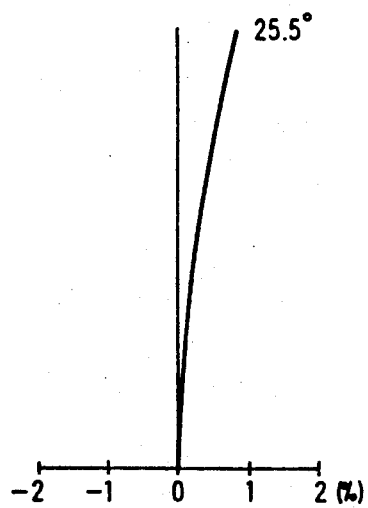
Figure 4D:
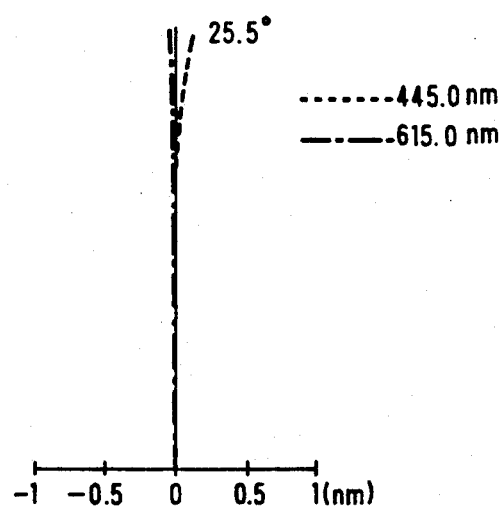

The lens construction of Embodiment 2 is shown in FIG. 3, including: a front group composed of a lens component $L_1$ taking the form of a positive meniscus lens having a convex surface faced toward the screen in a center portion at and around the optical axis and having surface #1 concaved toward the screen and in a direction away from the optical axis to have a negative power in outer portions remote from the optical axis, a negative meniscus lens $L_2$ having a concave surface on the screen side, a negative plano-concave lens $L_3$, and a cemented lens component $L_4+L_5$ combining a biconvex positive lens $L_4$ with a negative meniscus lens $L_5$ having a concave surface on the screen side, and a positive biconvex lens $L_6$; and a rear group composed of a positive meniscus lens $L_7$ having a concave surface on the screen side and a negative biconcave lens $L_8$.

A relatively wide air spacing is formed between the first and second lens components $L_1$ and $L_2$, between the second and third lens components $L_2$ and $L_3$, between the sixth and seventh lens components $L_6$ and $L_7$, and between the seventh and eighth lens components $L_7$ ad $L_8$.

The particulars of the lens construction are as follows.

| \multicolumn{5}{c}{$f = 139.1$  $F = 1.1$} |
| Projective magnification: ×22.8 | | | | |
| m | r | d | n | ν |
|---|---|---|---|---|
| *1 | 231.750 | 9.00 | 1.49217 | 57.2 |
| *2 | 3799.330 | 32.46 | | |
| *3 | −102.490 | 8.00 | 1.49217 | 57.2 |
| *4 | −111.540 | 14.23 | | |
| 5 | ∞ | 4.50 | 1.60422 | 34.9 |
| 6 | 164.610 | 3.18 | | |
| 7 | 126.420 | 38.48 | 1.61656 | 62.1 |
| 8 | −153.330 | 4.50 | 1.68733 | 30.8 |
| 9 | −3689.560 | 0.98 | | |
| 10 | 109.240 | 22.50 | 1.61668 | 62.1 |
| 11 | −1578.560 | 36.13 | | |
| *12 | −561.780 | 7.00 | 1.49217 | 57.2 |
| *13 | −258.070 | 40.72 | | |
| *14 | −61.097 | 4.90 | 1.49217 | 57.2 |
| *15 | 4171.730 | 5.40 | | |
| 16(FP) | ∞ | 6.50 | 1.54212 | |
| 17(SP) | ∞ | 4.81 | 1.43000 | |
| 18(FP) | ∞ | 5.75 | 1.57125 | |
| 19 | ∞ | | | |

$\phi CS/\phi CL = 0.854$
Aspheric Coefficients

| | Surface #1 | Surface #2 |
|---|---|---|
| K | 0.0 | 0.0 |
| $a_1$ | $-1.5121901 \times 10^{-7}$ | $2.1387507 \times 10^{-8}$ |
| $a_2$ | $-1.0974252 \times 10^{-11}$ | $8.2029713 \times 10^{-13}$ |
| $a_3$ | $-1.2666195 \times 10^{-15}$ | $-5.9131560 \times 10^{-16}$ |
| $a_4$ | $-1.9597814 \times 10^{-19}$ | $-1.1392936 \times 10^{-19}$ |
| | Surface #3 | Surface #4 |
| K | 0.0 | 0.0 |
| $a_1$ | $6.1059933 \times 10^{-7}$ | $4.1216113 \times 10^{-7}$ |
| $a_2$ | $-7.6783200 \times 10^{-11}$ | $-7.4671053 \times 10^{-11}$ |
| $a_3$ | $6.7662864 \times 10^{-15}$ | $6.3753801 \times 10^{-15}$ |
| $a_4$ | $-1.3181279 \times 10^{-19}$ | $-2.8132982 \times 10^{-19}$ |
| | Surface #12 | Surface #13 |
| K | 0.0 | 0.0 |
| $a_1$ | $-7.5965096 \times 10^{-7}$ | $-4.0194295 \times 10^{-7}$ |
| $a_2$ | $3.1655739 \times 10^{-11}$ | $-1.0225428 \times 10^{-11}$ |
| $a_3$ | $-6.1771881 \times 10^{-16}$ | $3.5428137 \times 10^{-14}$ |
| $a_4$ | $1.9545892 \times 10^{-20}$ | $-1.1481523 \times 10^{-17}$ |
| | Surface #14 | Surface #15 |
| K | 0.0 | 0.0 |
| $a_1$ | $1.0446466 \times 10^{-7}$ | $-3.2063855 \times 10^{-9}$ |
| $a_2$ | $-1.6948798 \times 10^{-10}$ | $-3.5672285 \times 10^{-11}$ |
| $a_3$ | $9.3757217 \times 10^{-14}$ | $4.6550273 \times 10^{-15}$ |
| $a_4$ | $-1.9699950 \times 10^{-17}$ | $3.8694328 \times 10^{-19}$ |

FIG. 4 shows diagrams of aberrations calculated on the basis of the specific figures of the above lens construction.

EMBODIMENT 3

Figure 5:
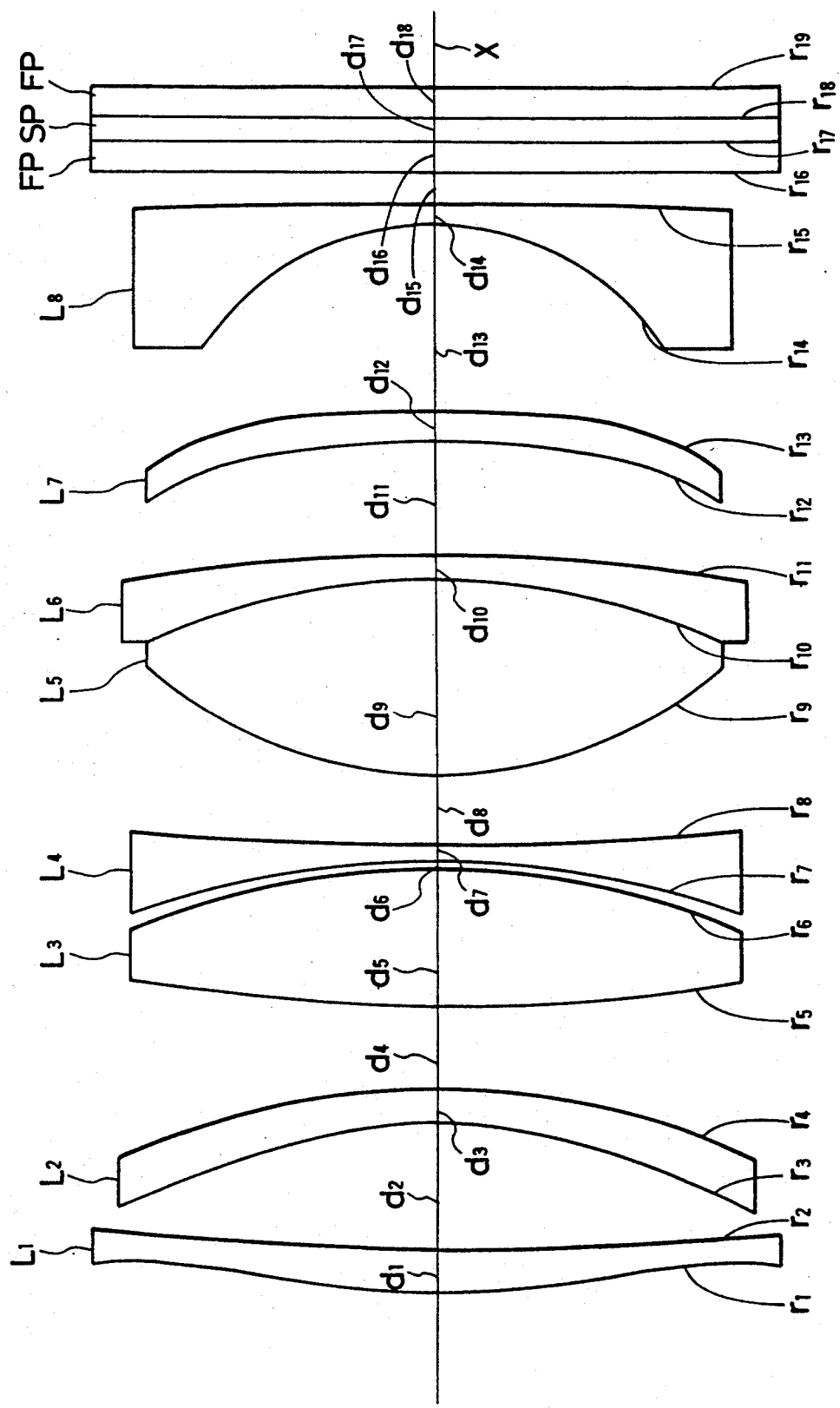
FIG. 5 is a diagrammatic illustration of lens construction in a third embodiment of the invention.
Figure 6A:
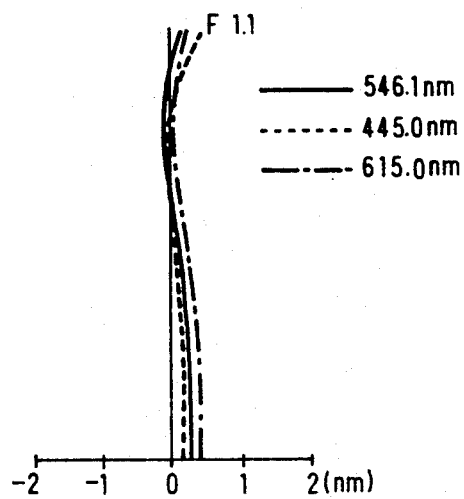
FIG. 6a-6d show diagrams of aberrations calculated on the basis of numerical data of the third embodiment.
Figure 6B:
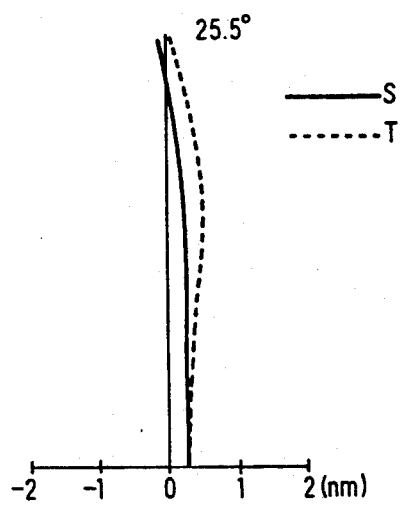
Figure 6C:
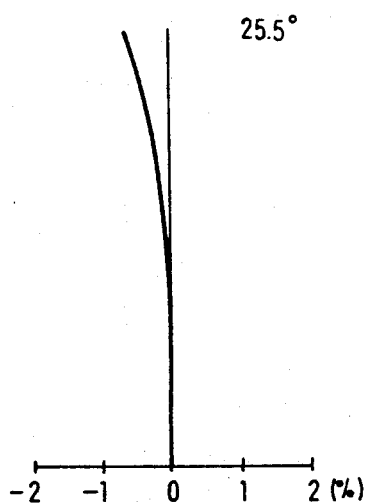
Figure 6D:
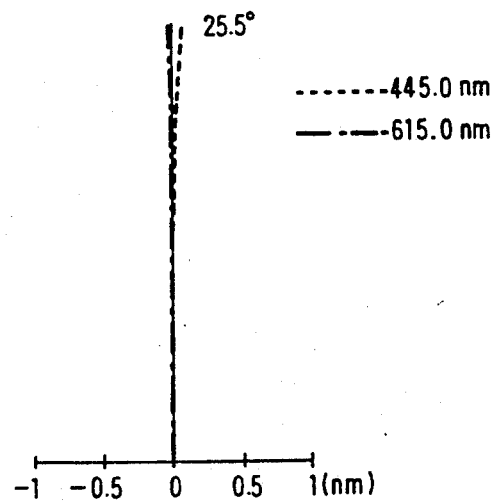

The lens construction of Embodiment 3 is shown in FIG. 5, including: a front group composed of a lens component $L_1$ taking the form of a positive meniscus lens having a convex surface on the screen side in a center portion at the optical axis with a convex surface faced toward the screen and having surface #1 concaved toward the screen and in a direction away from the optical axis to have a negative power in outer portions remote from the optical axis, a negative meniscus lens $L_2$ having a concave surface on the screen side, a positive biconvex lens $L_3$, and a biconcave lens $L_4$, and a cemented lens component $L_5+L_6$ $L_6$ combining a positive biconvex lens $L_5$ with a negative meniscus lens $L_6$ having a concave surface on the screen side; and a rear group composed of a negative meniscus lens $L_7$ having a concave surface on the screen side and a negative meniscus lens $L_8$ having a concave surface on the screen side.

A relatively wide air spacing is formed between the first and second lens components $L_1$ and $L_2$, between the second and third lens components $L_2$ and $L_3$, between the fourth and fifth lens components $L_4$ and $L_5$, between the sixth and seventh lens components $L_6$ and $L_7$, and between the seventh and eighth lens components $L_6$ and $L_8$.

The particulars of the lens construction are as follows.

| | f = 140.5 | F = 1.10 | | |
|---|---|---|---|---|
| | Projective magnification: ×22.6 | | | |
| m | r | d | n | ν |
| *1 | 226.970 | 9.00 | 1.49217 | 57.2 |
| *2 | 834.000 | 27.67 | | |
| *3 | −98.553 | 8.00 | 1.49217 | 57.2 |
| *4 | −123.930 | 17.68 | | |
| 5 | 395.140 | 30.00 | 1.61089 | 62.7 |
| 6 | −161.070 | 0.98 | | |
| 7 | −211.840 | 4.50 | 1.72692 | 28.9 |
| 8 | 923.430 | 15.17 | | |
| 9 | 100.210 | 42.00 | 1.61934 | 61.6 |
| 10 | −154.420 | 4.75 | 1.65552 | 32.4 |
| 11 | −438.600 | 24.67 | | |
| *12 | −398.600 | 7.00 | 1.49217 | 57.2 |
| *13 | −425.480 | 41.88 | | |
| *14 | −59.390 | 4.90 | 1.49217 | 57.2 |
| *15 | −1730.400 | 5.40 | | |
| 16(FP) | ∞ | 6.50 | 1.54212 | |
| 17(SP) | ∞ | 4.81 | 1.43000 | |
| 18(FP) | ∞ | 5.75 | 1.57125 | |
| 19 | ∞ | | | |

| $\phi CS/\phi CL = 0.652$ | |
|---|---|
| Aspheric Coefficients | |
| Surface #1 | Surface #2 |
| K  0.0 | 0.0 |
| $a_1$  $-1.3340655 \times 10^{-7}$ | $6.4596038 \times 10^{-9}$ |
| $a_2$  $-2.9119908 \times 10^{-12}$ | $7.1057074 \times 10^{-12}$ |
| $a_3$  $-5.5114775 \times 10^{-16}$ | $-2.7987945 \times 10^{-16}$ |
| $a_4$  $-2.1577888 \times 10^{-19}$ | $-8.9482018 \times 10^{-20}$ |
| Surface #3 | Surface #4 |
| K  0.0 | 0.0 |
| $a_1$  $6.3927556 \times 10^{-7}$ | $4.8079350 \times 10^{-7}$ |
| $a_2$  $-7.3880579 \times 10^{-11}$ | $-7.2752777 \times 10^{-11}$ |
| $a_3$  $6.8221852 \times 10^{-15}$ | $6.3614033 \times 10^{-15}$ |
| $a_4$  $-1.8996932 \times 10^{-19}$ | $-2.7790814 \times 10^{-19}$ |
| Surface #12 | Surface #13 |
| K  0.0 | 0.0 |
| $a_1$  $-6.7626370 \times 10^{-7}$ | $-4.0680440 \times 10^{-7}$ |
| $a_2$  $3.808941 \times 10^{-11}$ | $-1.2870310 \times 10^{-11}$ |
| $a_3$  $-9.4123237 \times 10^{-16}$ | $3.5311983 \times 10^{-14}$ |
| $a_4$  $-3.4484476 \times 10^{-20}$ | $-1.1520449 \times 10^{-17}$ |
| Surface #14 | Surface #15 |
| K  0.0 | 0.0 |
| $a_1$  $1.2343037 \times 10^{-7}$ | $-3.0583151 \times 10^{-8}$ |
| $a_2$  $-1.7756649 \times 10^{-10}$ | $-2.6169089 \times 10^{-11}$ |
| $a_3$  $9.3258252 \times 10^{-14}$ | $4.5657601 \times 10^{-15}$ |
| $a_4$  $-1.9751972 \times 10^{-17}$ | $3.2707911 \times 10^{-19}$ |

FIG. 6 shows diagrams of aberrations calculated on the basis of the specific figures of the above lens construction.

EMBODIMENT 4

Figure 7:
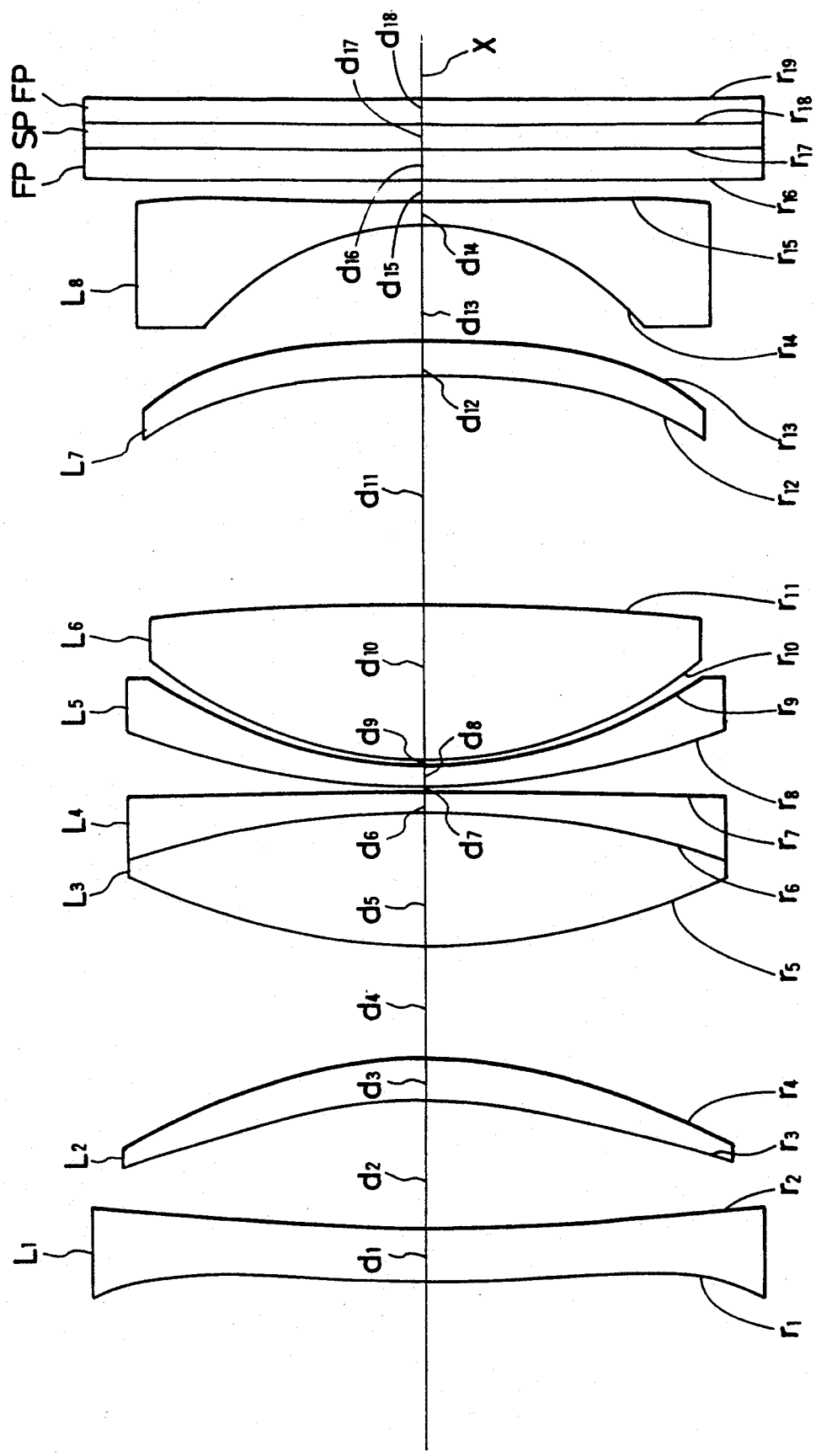
FIG. 7 is a diagrammatic illustration of lens construction in a fourth embodiment of the invention.
Figure 8A:
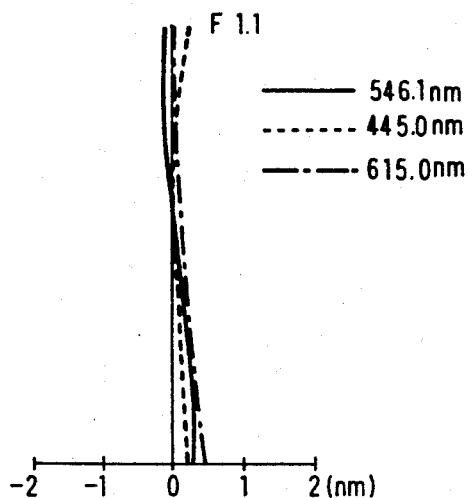
FIGS. 8a-8d show diagrams of aberrations calculated on the basis of numerical data of the fourth embodiment.
Figure 8B:
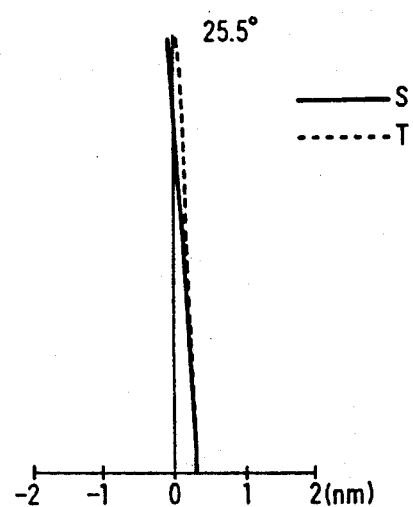
Figure 8C:
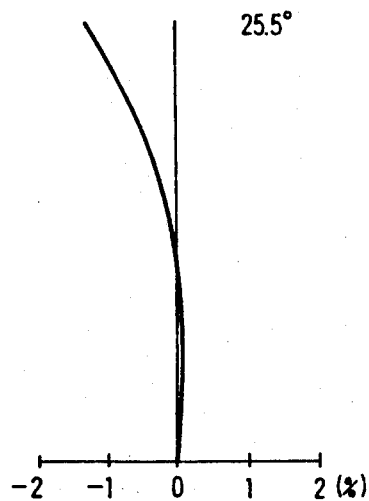
Figure 8D:
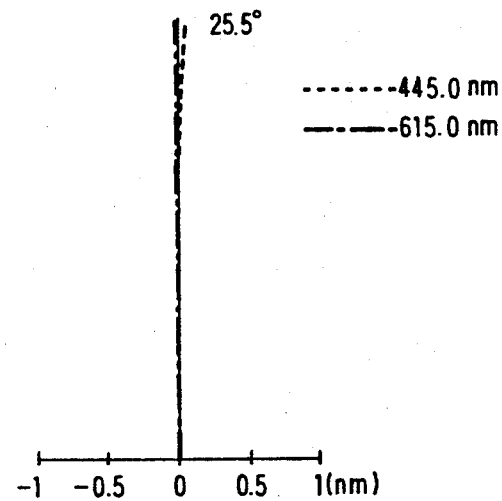
Figure 9A:
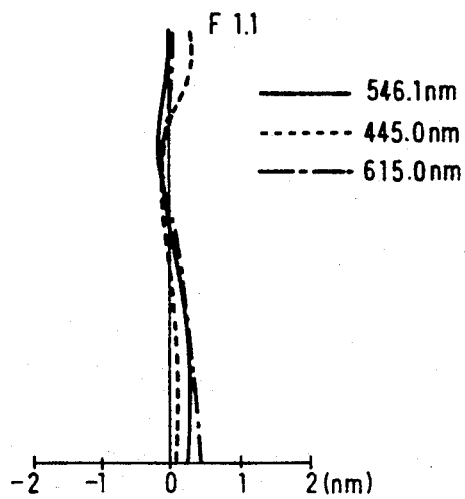
FIGS. 9a-9d show diagrams of aberrations calculated on the basis of numerical data of a fifth embodiment of the invention.
Figure 9B:
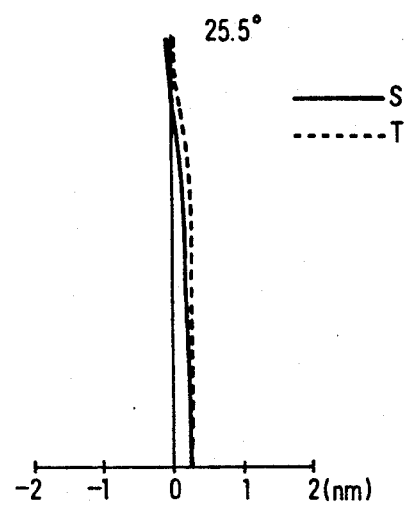
Figure 9C:
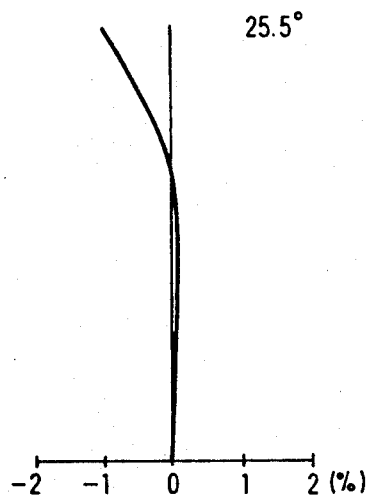
Figure 9D:
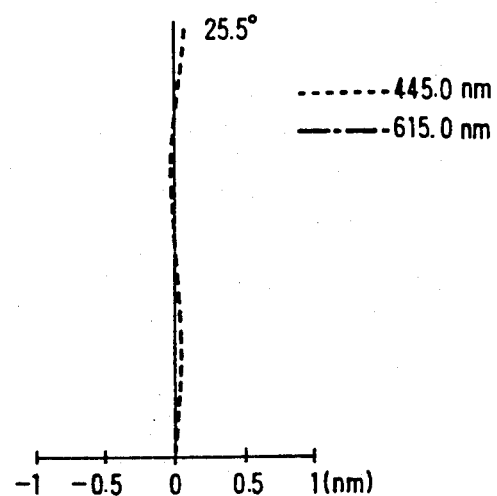
Figure 11A:
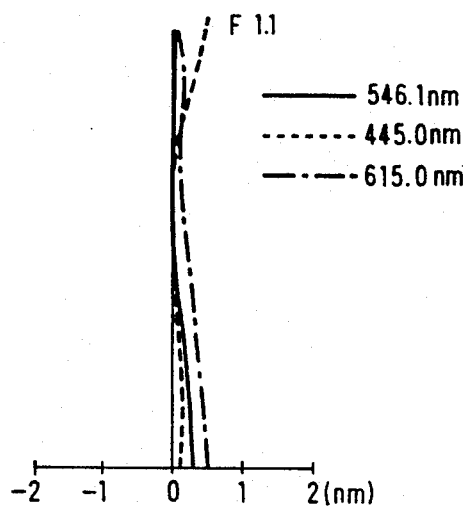
FIGS. 11a-11d show diagrams of aberrations calculated on the basis of numerical data of the sixth embodiment.
Figure 11B:
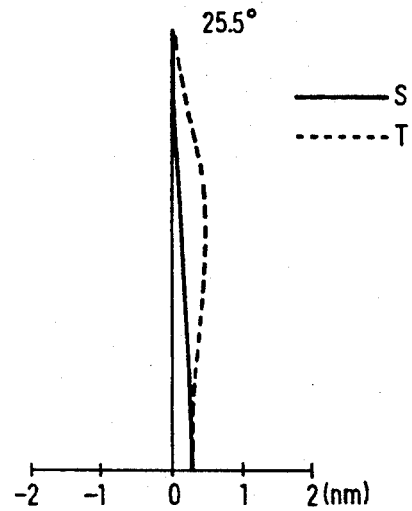
Figure 11C:
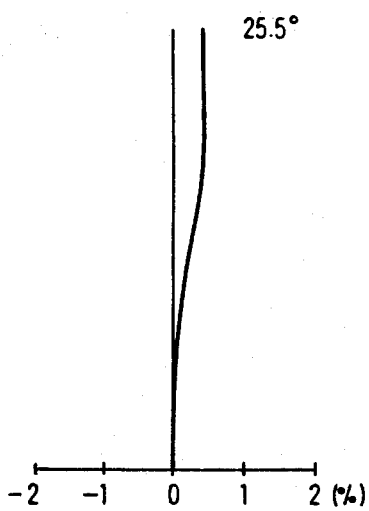
Figure 11D:
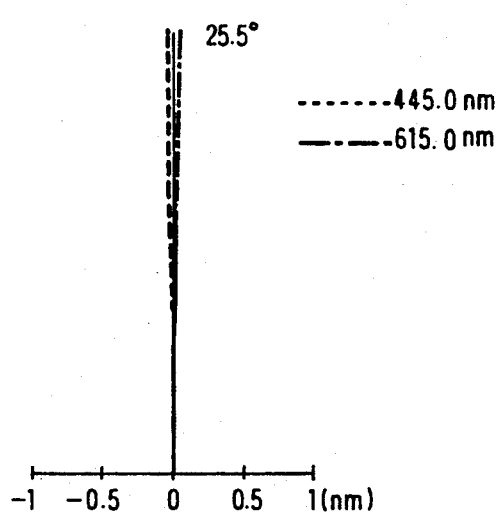

The lens construction of Embodiment 4 is shown in FIG. 7, including: a front group composed of a lens component $L_1$ taking the form of a positive meniscus lens having a convex surface on the screen side in a center portion at and around the optical axis and having the surface #1 concaved toward the screen and in a direction away from the optical axis to have a negative power in outer portions remote from the optical axis, a negative meniscus lens $L_2$ having a concave surface on the screen side, a cemented lens component $L_3+L_4$ combining a positive biconvex lens $L_3$ with a negative meniscus lens $L_4$ having a concave surface on the screen side, and a negative meniscus lens $L_5$ having a convex surface on the screen side, and a positive biconvex lens $L_6$; and a rear group composed of a positive meniscus lens $L_7$ having a concave surface on the screen side and a negative biconcave lens $L_8$.

A relatively wide air spacing is formed between the first and second lens components $L_1$ and $L_2$, between the second and third lens components $L_2$ and $L_3$, between the sixth and seventh lens components $L_6$ and $L_7$, and between the seventh and eighth lens components $L_7$ and $L_8$.

The particulars of the lens construction are as follows.

| | f = 141.3 | F = 1.10 | | |
|---|---|---|---|---|
| | Projective magnification: ×22.4 | | | |
| m | r | d | n | ν |
| *1 | 464.020 | 12.00 | 1.49217 | 57.2 |
| *2 | 1036.950 | 28.63 | | |
| *3 | −99.388 | 9.00 | 1.49217 | 57.2 |
| *4 | −101.774 | 24.25 | | |
| 5 | 164.174 | 30.02 | 1.61399 | 62.5 |
| 6 | −200.140 | 4.50 | 1.84841 | 25.9 |
| 7 | −2237.240 | 0.98 | | |
| 8 | 201.830 | 4.75 | 1.61270 | 34.5 |
| 9 | 111.490 | 0.98 | | |
| 10 | 103.120 | 35.00 | 1.64556 | 56.4 |
| 11 | −600.280 | 50.06 | | |
| *12 | −445.450 | 8.00 | 1.49217 | 57.2 |
| *13 | −290.690 | 25.74 | | |
| *14 | −65.582 | 4.90 | 1.49217 | 57.2 |
| *15 | 930.530 | 5.40 | | |
| 16(FP) | ∞ | 6.50 | 1.54212 | |
| 17(SP) | ∞ | 4.81 | 1.43000 | |
| 18(FP) | ∞ | 5.75 | 1.57125 | |
| 19 | ∞ | | | |

| $\phi CS/\phi CL = 0.637$ | |
|---|---|
| Aspheric Coefficients | |
| Surface #1 | Surface #2 |
| K  0.0 | 0.0 |
| $a_1$  $-2.3883790 \times 10^{-7}$ | $-1.8252131 \times 10^{-10}$ |
| $a_2$  $-1.4934589 \times 10^{-11}$ | $1.3048477 \times 10^{-11}$ |
| $a_3$  $-3.4017095 \times 10^{-16}$ | $-7.9512398 \times 10^{-16}$ |
| $a_4$  $-1.5157502 \times 10^{-19}$ | $-1.5102665 \times 10^{-19}$ |
| Surface #3 | Surface #4 |
| K  0.0 | 0.0 |
| $a_1$  $7.2926170 \times 10^{-7}$ | $4.7976189 \times 10^{-7}$ |
| $a_2$  $-7.1952844 \times 10^{-11}$ | $-7.7347947 \times 10^{-11}$ |

-continued

| | | |
|---|---|---|
| $a_3$ | $6.5703992 \times 10^{-15}$ | $6.2969385 \times 10^{-15}$ |
| $a_4$ | $-2.3831746 \times 10^{-19}$ | $-3.0835876 \times 10^{-19}$ |
| | Surface #12 | Surface #13 |
| K | 0.0 | 0.0 |
| $a_1$ | $-7.3751856 \times 10^{-7}$ | $-4.1432901 \times 10^{-7}$ |
| $a_2$ | $3.6380528 \times 10^{-11}$ | $-1.2070956 \times 10^{-11}$ |
| $a_3$ | $-1.1923846 \times 10^{-15}$ | $3.5537837 \times 10^{-14}$ |
| $a_4$ | $-4.3385064 \times 10^{-20}$ | $-1.1515370 \times 10^{-17}$ |
| | Surface #14 | Surface #15 |
| K | 0.0 | 0.0 |
| $a_1$ | $1.3033266 \times 10^{-7}$ | $-1.2150742 \times 10^{-7}$ |
| $a_2$ | $-1.7801316 \times 10^{-10}$ | $-2.8274213 \times 10^{-11}$ |
| $a_3$ | $9.3210856 \times 10^{-14}$ | $4.7945056 \times 10^{-15}$ |
| $a_4$ | $-1.9754168 \times 10^{-17}$ | $3.3695125 \times 10^{-19}$ |

FIG. 8 shows diagrams of aberrations calculated on the basis of the specific figures of the above lens construction.

EMBODIMENT 5

The lens construction of this embodiment is substantially same as that of FIG. 1, and its particulars are as follows.

| | f = 141.1 | F = 1.10 | | |
|---|---|---|---|---|
| | Projective magnification: ×22.51 | | | |
| m | r | d | n | ν |
| *1 | 233.780 | 12.00 | 1.49217 | 57.2 |
| *2 | ∞ | 33.49 | | |
| *3 | −112.780 | 10.00 | 1.49217 | 57.2 |
| *4 | −105.350 | 17.15 | | |
| 5 | −147.650 | 4.50 | 1.59155 | 36.8 |
| 6 | 139.780 | 1.36 | | |
| 7 | 138.640 | 26.95 | 1.73890 | 54.2 |
| 8 | −295.780 | 6.66 | | |
| 9 | 102.650 | 38.80 | 1.60586 | 63.0 |
| 10 | −162.520 | 4.75 | 1.85160 | 30.2 |
| 11 | −405.540 | 32.51 | | |
| *12 | −403.430 | 9.00 | 1.49217 | 57.2 |
| *13 | −282.910 | 37.24 | | |
| *14 | −60.300 | 4.90 | 1.49217 | 57.2 |
| *15 | −1941.460 | 5.40 | | |
| 16(FP) | ∞ | 6.50 | 1.54212 | |
| 17(SP) | ∞ | 4.81 | 1.43000 | |
| 18(FP) | ∞ | 5.75 | 1.57125 | |
| 19 | ∞ | | | |

| $\phi$ CS/$\phi$ CL = 0.381 | |
|---|---|
| Aspheric Coefficients | |
| Surface #1 | Surface #2 |
| K 0.0 | 0.0 |
| $a_1$ $-1.315002 \times 10^{-7}$ | $2.1684066 \times 10^{-8}$ |
| $a_2$ $-8.3303212 \times 10^{-12}$ | $4.0831475 \times 10^{-12}$ |
| $a_3$ $-6.2695348 \times 10^{-16}$ | $-7.1172807 \times 10^{-16}$ |
| $a_4$ $-1.7725284 \times 10^{-19}$ | $-1.0935648 \times 10^{-19}$ |
| Surface #3 | Surface #4 |
| K 0.0 | 0.0 |
| $a_1$ $6.3715896 \times 10^{-7}$ | $4.6533706 \times 10^{-7}$ |
| $a_2$ $-7.7727237 \times 10^{-11}$ | $-7.5139162 \times 10^{-11}$ |
| $a_3$ $6.3176244 \times 10^{-15}$ | $6.7069834 \times 10^{-15}$ |
| $a_4$ $-1.9108412 \times 10^{-19}$ | $-2.4251350 \times 10^{-19}$ |
| Surface #12 | Surface #13 |
| K 0.0 | 0.0 |
| $a_1$ $-7.8200334 \times 10^{-7}$ | $-4.3268398 \times 10^{-7}$ |
| $a_2$ $3.1862923 \times 10^{-11}$ | $-1.2927298 \times 10^{-11}$ |
| $a_3$ $-8.6099283 \times 10^{-16}$ | $3.5458889 \times 10^{-14}$ |
| $a_4$ $-1.1342997 \times 10^{-21}$ | $-1.1489533 \times 10^{-17}$ |
| Surface #14 | Surface #15 |
| K 0.0 | 0.0 |
| $a_1$ $1.9016960 \times 10^{-7}$ | $-1.2723903 \times 10^{-7}$ |
| $a_2$ $-1.6952749 \times 10^{-10}$ | $-3.7573942 \times 10^{-11}$ |
| $a_3$ $9.3618812 \times 10^{-14}$ | $4.6667094 \times 10^{-15}$ |
| $a_4$ $-1.9716303 \times 10^{-17}$ | $3.8043569 \times 10^{-19}$ |

FIG. 9 shows diagrams of aberrations calculated on the basis of the specific figures of the above lens construction.

EMBODIMENT 6

The lens construction of Embodiment 6 is shown in FIG. 10, including: a front group composed of a lens $L_1$ taking the form of a biconvex lens in a center portion at and around the optical axis and having surface #1 concaved toward the screen and in a direction away from the optical axis to have a negative power in outer portions remote from the optical axis, a negative meniscus lens $L_2$ having a concave surface on the screen side, a negative planoconcave lens $L_3$, a positive biconvex lens $L_4$, a cemented lens component $L_5+L_6$ combining a positive biconvex lens $L_5$ with a negative meniscus lens $L_6$ having a concave surface on the screen side; and a rear group composed of with a positive meniscus lens $L_7$ having a concave surface on the screen side and a biconcave lens $L_8$.

A relatively wide air spacing is formed between the first and second lens components $L_1$ and $L_2$, between the second and third lens components $L_2$ and $L_3$, between the sixth and seventh lens components $L_6$ and $L_7$, and between the seventh and eighth lens components $L_7$ and $L_8$.

The particulars of the above lens construction are as follows.

| | f = 139.7 | F = 1.10 | | |
|---|---|---|---|---|
| | Projective magnification: ×22.75 | | | |
| m | r | d | n | ν |
| *1 | 291.090 | 9.00 | 1.49217 | 57.2 |
| *2 | −1365.280 | 26.75 | | |
| *3 | −103.205 | 8.00 | 1.49217 | 57.2 |
| *4 | −116.777 | 11.02 | | |
| 5 | ∞ | 4.50 | 1.62408 | 36.3 |
| 6 | 121.018 | 4.14 | | |
| 7 | 124.755 | 23.50 | 1.59143 | 61.2 |
| 8 | −828.360 | 22.59 | | |
| 9 | 100.283 | 35.00 | 1.59143 | 61.2 |
| 10 | −165.552 | 4.75 | 1.81264 | 25.5 |
| 11 | −374.431 | 40.06 | | |
| *12 | −288.570 | 7.00 | 1.49217 | 57.2 |
| *13 | −177.495 | 33.27 | | |
| *14 | −60.354 | 4.90 | 1.49217 | 57.2 |
| *15 | 1676.650 | 5.40 | | |
| 16(FP) | ∞ | 6.50 | 1.54212 | |
| 17(SP) | ∞ | 4.81 | 1.43000 | |
| 18(FP) | ∞ | 5.75 | 1.57125 | |
| 19 | ∞ | | | |

| $\phi$ CS/$\phi$ CL = 0.530 | |
|---|---|
| Aspheric Coefficients | |
| Surface #1 | Surface #2 |
| K 0.0 | 0.0 |
| $a_1$ $-1.7467192 \times 10^{-7}$ | $1.5816232 \times 10^{-8}$ |
| $a_2$ $-2.9699068 \times 10^{-12}$ | $9.0793432 \times 10^{-12}$ |
| $a_3$ $-4.0089825 \times 10^{-16}$ | $-5.2194187 \times 10^{-16}$ |
| $a_4$ $-2.7906859 \times 10^{-19}$ | $-1.7256041 \times 10^{-19}$ |
| Surface #3 | Surface #4 |
| K 0.0 | 0.0 |
| $a_1$ $7.0623531 \times 10^{-7}$ | $4.6334921 \times 10^{-7}$ |
| $a_2$ $-9.4976831 \times 10^{-11}$ | $-8.9595514 \times 10^{-11}$ |
| $a_3$ $8.7031708 \times 10^{-15}$ | $8.1403418 \times 10^{-15}$ |
| $a_4$ $-2.2250881 \times 10^{-19}$ | $-3.6618399 \times 10^{-19}$ |
| Surface #12 | Surface #13 |
| K 0.0 | 0.0 |
| $a_1$ $-7.9842886 \times 10^{-7}$ | $-4.0981541 \times 10^{-7}$ |
| $a_2$ $3.2004929 \times 10^{-11}$ | $-1.2683858 \times 10^{-11}$ |
| $a_3$ $-1.6768159 \times 10^{-15}$ | $3.6476696 \times 10^{-14}$ |
| $a_4$ $-1.1752111 \times 10^{-20}$ | $-1.1459020 \times 10^{-17}$ |
| Surface #14 | Surface #15 |
| K 0.0 | 0.0 |
| $a_1$ $1.9494254 \times 10^{-7}$ | $1.2820691 \times 10^{-8}$ |

-continued

| | | |
|---|---|---|
| $a_2$ | $-1.7830976 \times 10^{-10}$ | $-4.9161488 \times 10^{-11}$ |
| $a_3$ | $9.2302098 \times 10^{-14}$ | $5.5677252 \times 10^{-15}$ |
| $a_4$ | $-1.97433930 \times 10^{-17}$ | $4.8079855 \times 10^{-19}$ |

FIG. 11 shows diagrams of aberrations calculated on the basis of the specific figures of the above lens construction.

What is claimed is:

1. A projection lens system, comprising consecutively from the side of the viewing screen:
   a first lens component $L_1$ in the form of a positive plastic lens;
   a second lens component $L_2$ in the form of a plastic lens of weak power;
   third to sixth lens components $L_3$ and $L_6$ constituted by a combination of a couple of convex glass lenses of strong power and a couple of concave glass lenses of strong power;
   a seventh lens component $L_7$ in the form of a plastic lens of weak power; and
   an eighth lens component $L_8$ in the form of a negative plastic lens of strong power having a concave surface on the side of the viewing screen;
   at least one of the lens surfaces of each of said first lens component $L_1$, second lens component $L_2$, seventh lens component $L_7$ and eighth lens component $L_8$ being an aspheric surface;
   wherein said couple of concave glass lenses constituting two of said lens components $L_3$ to $L_6$ satisfy the condition of b $0.3 < \phi_{CS}/\phi_{CL} < 1.0$ wherein $\phi_{CL}$ is the lens power of the strong one of said concave glass lenses and $\phi_{CS}$ is the lens power of said weaker concave glass lens.

2. A projection lens system as defined in claim 1, comprising: a lens component $L_1$ taking the form of a biconvex lens in a center portion at and around the optical axis of said lens system and having surface #1 concaved toward the screen and in a direction away from the optical axis to have a negative power in outer portions remote from the optical axis; a positive meniscus lens component $L_2$ having a concave surface on the screen side; a negative biconcave lens $L_3$; a positive biconvex lens $L_4$, a cemented lens component $L_5+L_6$ combining a positive biconvex lens $L_5$ with a negative lens $L_6$ having a concave surface on the screen side; a positive meniscus lens $L_7$ having a concave surface on the screen side; and a negative meniscus lens $L_8$ having a concave surface on the screen side.

3. A projection lens system as defined in claim 1, comprising: a lens component $L_1$ taking the form of a positive meniscus lens having a convex surface faced toward the screen in a center portion at and around the optical axis of the lens system and having surface #1 concaved toward the screen and in a direction away from the optical axis to have a negative power in outer portions remote from said optical axis; a negative meniscus lens $L_2$ having a concave surface on the screen side; a negative lens $L_3$; a cemented lens component $L_4+L_5$ combining a biconvex positive lens $L_4$ with a negative lens $L_5$ having a concave surface on the screen side; a positive lens $L_6$ having a convex surface on the screen side; a positive meniscus lens $L_7$ having a concave surface on the screen side; and a negative lens $L_8$ having a concave surface on the screen side.

4. A projection lens system as defined in claim 1, comprising: a lens component $L_1$ taking the form of a positive meniscus lens having a convex surface on the screen side in a center portion at the optical axis with a convex surface faced toward the screen and having surface #1 concaved toward the screen and in a direction away from the optical axis to have a negative power in outer portions remote from the optical axis; a negative meniscus lens $L_2$ having a concave surface on the screen side; a positive biconvex lens $L_3$; a negative lens $L_4$ having a concave surface on the screen side; a cemented lens component $L_5+L_6$ combining a positive biconvex lens $L_5$ with a negative lens $L_6$ having a concave surface on the screen side; a negative meniscus lens $L_7$ having a concave surface on the screen side; and a negative meniscus lens $L_8$ having a concave surface on the screen side.

5. A projection lens system as defined in claim 1, comprising: a lens component $L_1$ taking the form of a positive meniscus lens having a convex surface on the screen side in a center portion at and around the optical axis of said lens system and having surface #1 concaved toward the screen and in a direction away from the optical axis to have a negative power in outer portions remote from the optical axis; a negative meniscus lens $L_2$ having a concave surface on the screen side; a cemented lens component $L_3+L_4$ combining a positive biconvex lens $L_3$ with a negative meniscus lens $L_4$ having a concave surface on the screen side; a negative meniscus lens $L_5$ having a convex surface on the screen side; a positive biconvex lens $L_6$; a positive meniscus lens $L_7$ having a concave surface on the screen side; and a negative lens $L_5$ having a concave surface on the screen side.

6. A projection lens system, comprising consecutively from the side of the viewing screen:
   a first lens component $L_1$ in the form of a positive plastic lens;
   a second lens component $L_2$ in the form of a plastic lens of weak power;
   third to sixth lens components $L_3$ to $L_6$ constituted by a combination of a couple of convex glass lenses of strong power and a couple of concave glass lenses of strong power;
   a seventh lens component $L_7$ in the form of a plastic lens of weak power; and
   an eighth lens component $L_8$ in the form of a negative plastic lens of strong power having a concave surface on the side of the viewing screen;
   at least one of the lens surfaces of each of said first lens component $L_1$, second lens component $L_2$, seventh lens component $L_7$ and eighth lens component $L_8$ being an aspheric surface;
   said projection lens system further comprising: a lens component $L_1$ taking the form of a biconvex lens in a center portion at and around the optical axis of said lens system and having surface #1 concaved toward the screen and in a direction away from the optical axis to have a negative power in outer portions remote from the optical axis; a negative meniscus lens $L_2$ having a concave surface on the screen side; a negative lens $L_3$ having a concave surface on the imaging side; a positive biconvex lens $L_4$; a cemented lens component $L_5+L_6$ combining a positive biconvex lens $L_5$ with a negative lens $L_6$ having a concave surface on the screen side; a positive meniscus lens $L_7$ having a concave surface on the screen side; and a negative lens $L_8$ having a concave surface on the screen side.

* * * * *